J. F. HOUGHTON.
OVEN RACKS.

No. 189,937. Patented April 24, 1877.

WITNESSES
INVENTOR
By his Att'ys.

UNITED STATES PATENT OFFICE.

JESSE F. HOUGHTON, OF BOSTON, MASSACHUSETTS, ASSIGNOR TO SEWALL D. BALKAM, OF SAME PLACE.

IMPROVEMENT IN OVEN-RACKS.

Specification forming part of Letters Patent No. 189,937, dated April 24, 1877; application filed March 13, 1876.

*To all whom it may concern:*

Be it known that I, JESSE F. HOUGHTON, of Boston, in the county of Suffolk, and State of Massachusetts, have invented a new and useful Improvement in Oven-Racks; and I do hereby declare that the following is a full, clear, and exact description thereof, reference being had to the accompanying drawing, and to the letters of reference marked thereon.

This invention is an improved rack intended to be used in ovens of cook-stoves, and is so arranged as to be capable of being drawn out for nearly its entire length, serving the purpose of a shelf, and supporting the contents of the oven, but is prevented from being drawn entirely out and dropping upon the floor. At the same time it can be easily removed, and may be applied to any oven.

The nature of the invention in detail is fully described below.

Figure 1:
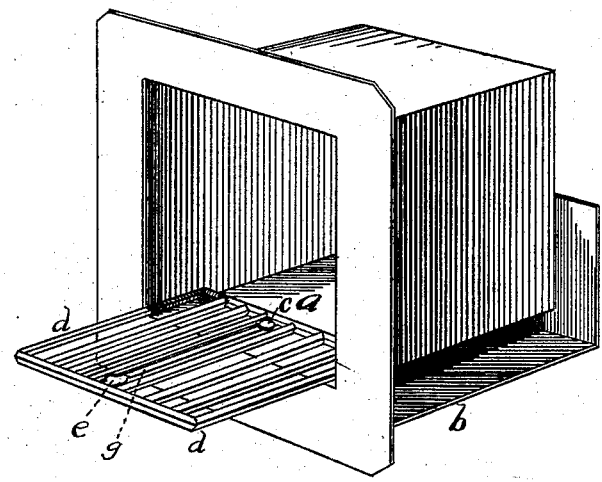
Figure 2:
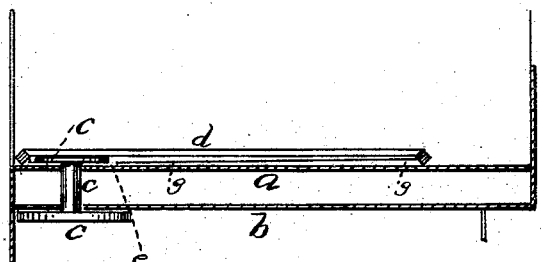
Figure 3:
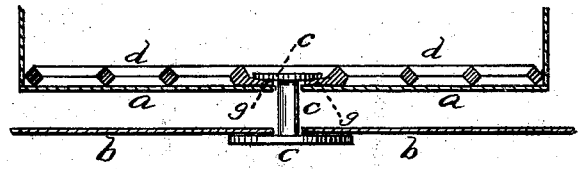

In the accompanying illustration Figure 1 is a view of an oven provided with my rack. Fig. 2 is a longitudinal section of the rack and bottoms of the oven and stove. Fig. 3 is a transverse section of the same.

Similar letters of reference indicate corresponding parts.

$a$ represents the bottom of the oven, and $b$ the bottom of the stove. Holes are drilled through the plates $a$ and $b$, and a button, $c$, is secured in the said holes. The upper plate of the said button is raised slightly from the oven-bottom $a$.

$d$ is the rack provided with an opening, $e$, a little back of the front edge, and of the proper size and shape to admit of the passage of the button $c$ through it, as seen in Fig. 2.

To place the rack into the oven, put the opening $e$ over the button $c$. If the contents of the oven are to be removed, instead of reaching in and taking them out, draw out the rack, as in Fig. 1, and the contents of the oven, being upon it, are drawn out with it, and supported outside the oven. The flanges $g\ g$, projecting inwardly from the two center bars, prevent the rack from falling by hugging the button $c$, as seen in Fig. 3. The opening $e$, in said flanges, allows the removal of the rack, and the rear bar prevents its being drawn entirely out when in use.

Thus it will be seen that it makes a safe and firm shelf when desired.

In order to allow of as much radiating-surface as possible upon the oven-bottom $a$, the bars of the rack, instead of being made flat, are made diamond-shaped, three-sided, or in any similar shape, so that a sharp edge only may be presented to the oven-bottom. This is a great advantage in applying it to stoves which do not bake well on the bottom, as but little, comparatively, of the bottom of the oven is covered.

My rack may be applied to any stove, whether in the hands of the manufacturer or consumer, by merely drilling through the oven and stove-bottom and inserting the button $c$, or a similar device.

In order that the rack may be still more firm when drawn out, the flanges $g\ g$ may be made to increase in thickness toward the back part of the rack, as seen in Fig. 2, but this is not absolutely necessary.

Having thus fully described my invention, what I claim, and desire to secure by Letters Patent, is—

1. In an oven-rack arranged to slide upon the bottom of the oven the combination of the button $c$, attached to the oven or stove-bottom, and rack $d$, provided with flanges $g\ g$, and opening $e$, said opening being large enough to allow the head of said button to pass through it, all arranged and constructed substantially as herein set forth.

2. In an oven-rack, bars constructed as described, so as to present sharp edges to the oven-bottom, substantially as set forth.

JESSE F. HOUGHTON.

Witnesses:
HENRY W. WILLIAMS,
JOHN H. GATELY.